C. A. MORRIS.
HOISTING AND CONVEYING MECHANISM.
APPLICATION FILED DEC. 22, 1909.
1,170,774.
Patented Feb. 8, 1916.
3 SHEETS—SHEET 1.
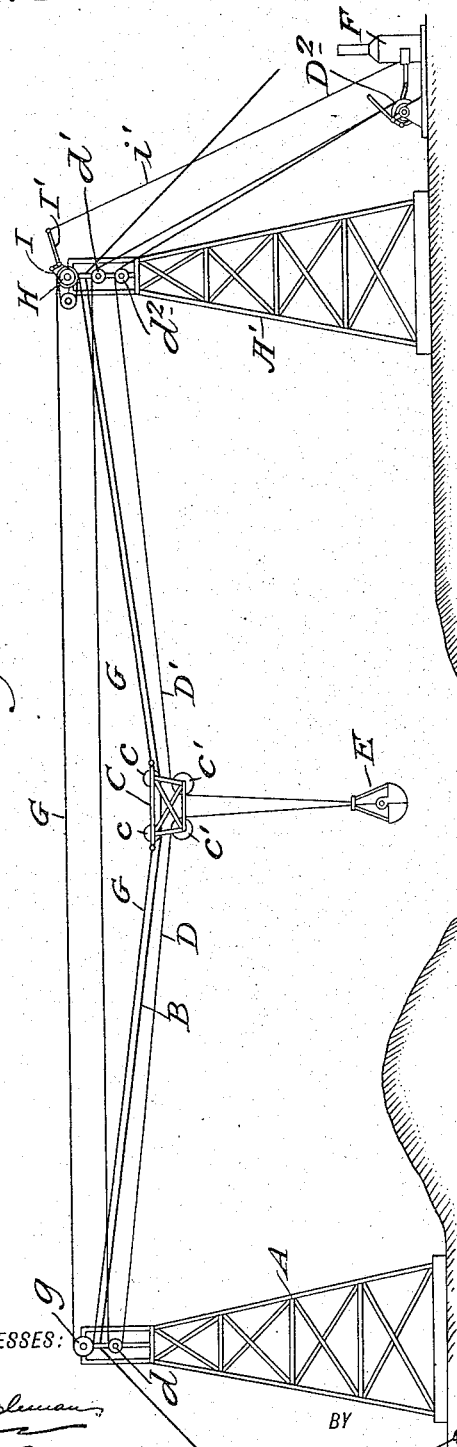
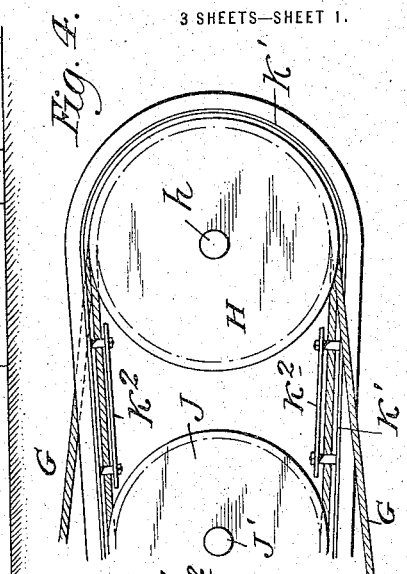
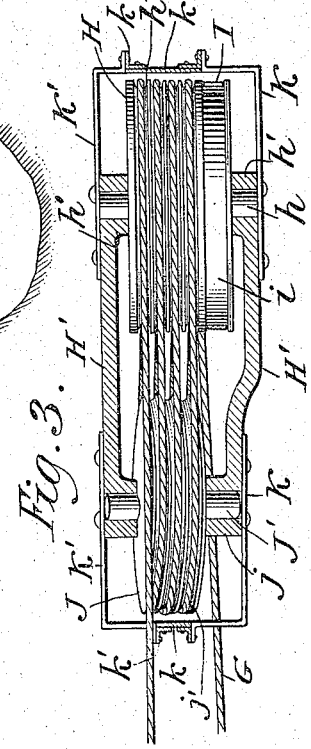
WITNESSES:
A. R. Appleman
M. C. Powell
INVENTOR
Charles A. Morris
BY
Griffin Bernhard
ATTORNEYS

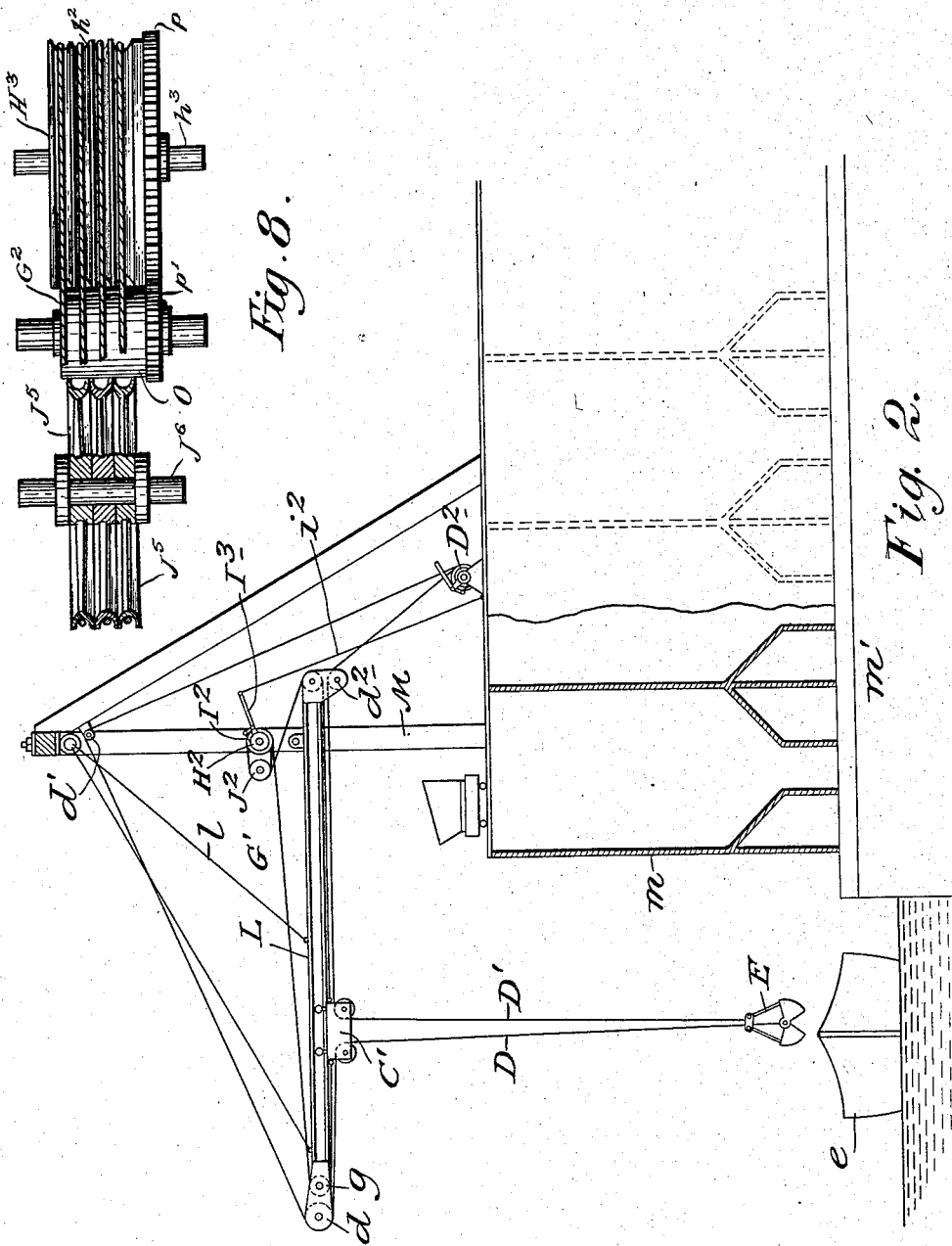

C. A. MORRIS.
HOISTING AND CONVEYING MECHANISM.
APPLICATION FILED DEC. 22, 1909.

1,170,774.

Patented Feb. 8, 1916.
3 SHEETS—SHEET 3.

WITNESSES:
A. R. Appleman
M. C. Powell

INVENTOR
Charles H. Morris.
BY Griffin Bernhard
ATTORNEYS

THE COLUMBIA PLANOGRAPH CO., WASHINGTON, D. C.

UNITED STATES PATENT OFFICE.

CHARLES A. MORRIS, OF MONTCLAIR, NEW JERSEY, ASSIGNOR TO THE HAYWARD COMPANY, A CORPORATION OF NEW YORK.

HOISTING AND CONVEYING MECHANISM.

1,170,774.   Specification of Letters Patent.   Patented Feb. 8, 1916.

Application filed December 22, 1909. Serial No. 534,530.

*To all whom it may concern:*

Be it known that I, CHARLES A. MORRIS, a citizen of the United States, residing in Montclair, county of Essex, and State of New Jersey, have invented a certain new and useful Hoisting and Conveying Mechanism, of which the following is a specification.

This invention embodies certain improvements in the hoisting and conveying mechanism described and claimed in my prior application, Serial No. 481,065, and relates, more particularly, to a device the function of which is to preclude a cable controlled by the traveling movement of a carriage from winding upon itself.

In the invention forming the subject matter of the prior application, a carriage is held in a predetermined position on an aerial track by means of a cable and a friction drum, but no device is embodied therein for preventing the runs of the cable from overlapping each other as the cable is wound on the friction drum. In the absence of such a device, the strands of the cable, as they are wound on the friction drum, will at times overlap and be brought into frictional wearing engagement, thereby decreasing the life of the cable and interfering with the general efficiency of the system.

The present invention is adapted for use as an adjunct to the mechanism disclosed in the prior application, and it successfully prevents the overlapping of the runs of the cable, thereby eliminating a disadvantage which heretofore has greatly impaired the durability of the cable, and, moreover, resulting in other advantages.

In the accompanying drawings I have illustrated different practical embodiments of the invention, but the constructions shown therein are to be understood as illustrative, only, and not as defining the limits of the invention.

Figure 5:
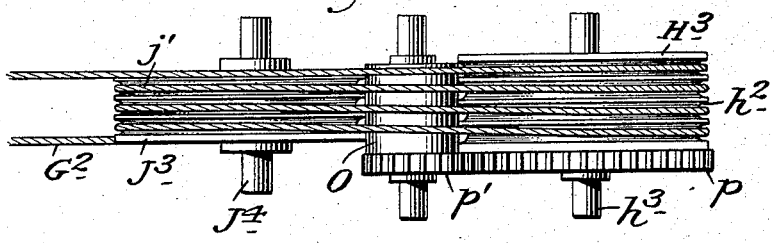
Figure 6:
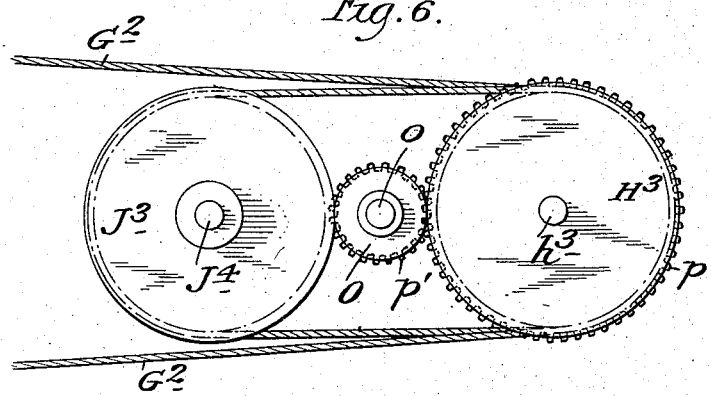
Figure 7:
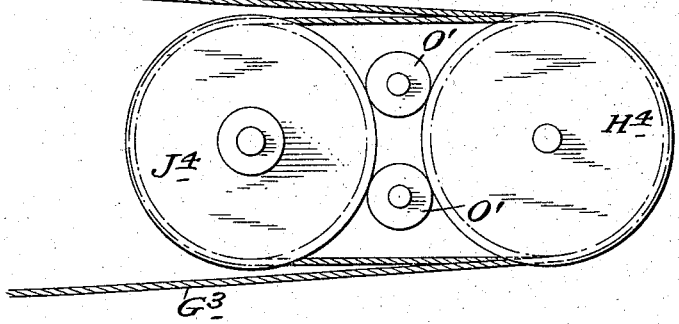

Figure 1 is a side elevation of my invention applied to a cableway of the class disclosed in my prior application Serial No. 481,065 to which reference has been made. Fig. 2 is a side elevation, partly in section, of the invention adapted for use in connection with a boom on which the carriage is adapted to travel, as disclosed, also, in said prior application. Fig. 3 is a horizontal section, partly in plan, illustrating the relationship of the cable directing drum in coöperative relation to the friction drum which is adapted to be controlled by suitable brake mechanism. Fig. 4 is an elevation of the device shown in Fig. 3, certain parts of the rope guide being in section. Fig. 5 is a plan view of another embodiment of the invention. Fig. 6 is an elevation of the structure shown in Fig. 5, and Fig. 7 illustrates a side view of a still further embodiment of the invention. Fig. 8 is a plan view illustrating another embodiment of the invention wherein a plurality of direction sheaves are employed in lieu of a single idler drum.

The cableway illustrated in Fig. 1 of the drawings embodies two towers, A, A', an aerial track formed by a cable, B, a carriage, C, adapted to travel on the aerial track, hauling ropes or cables, D, D', coöperating with the carriage and adapted to raise, lower and transport a load carrying device, such as bucket, E, and engine, F, for rotating a suitable drum whereby cables, D, D', are operated, and a controlling cable, G, attached to carriage, C, for the purpose of imparting movement to cable, G, by the motion of carriage, C. The carriage is provided with carrying wheels, $c$, which are adapted to travel on the aerial cable, and, furthermore, said carriage is provided with direction sheaves, $c'$, over which run the cables, D, D', for supporting and operating the load carrying device, E. Track cable, B, extends through the towers, and is anchored at suitable points beyond the line of the excavation, said track cable, B, spanning the excavation. Cable, D, passes upwardly over sheave, $c'$, at the left of the carriage, thence over a direction sheave, $d$, in tower, A, thence across the excavation to and over another direction sheave, $d'$, in tower, A', and thence to the engine operated drum, $D^2$. The other cable, D', passes from bucket, E, upwardly over sheave, $c'$, at the right of carriage, C, and from thence cable, D', passes over a direction sheave, $d^2$, in tower, A', and thence downwardly to the engine operated drum. Endless cable, G, has its respective ends attached to the sides of carriage, C, and one length of said cable, G, passes over a sheave, $g$, in tower, A. The other length of said endless cable, G, passes around a drum, H, mounted in the upper part of tower, A'. As shown in Figs. 3 and 4, drum, H, is supported for rotation in tower, A', by a shaft, h, the latter being mounted in bearings, h', of a frame, H', attached to the tower in any suitable or desirable way.

According to the present invention the friction drum, H, is provided with a series of annular concentric grooves, $h^2$, and said drum is provided, also, with a brake surface, i, with which coöperates a suitable brake, I, the latter being shown in the form of a band brake, the ends of which are connected with an operating lever, I', from which leads an operating line, i', see Fig. 1. When tension is placed on the operating line, i', lever, I', is moved in a direction to apply band brake, I, for the purpose of locking drum, H, against rotation, whereby the drum arrests cable, G, and the travel of carriage, C, thus locking the carriage against movement on the aerial track, B, against the pull of cables, D or D'.

Coöperating with friction drum, H, is an idler drum, J, the latter being mounted for rotation freely on a shaft, J', which is journaled in suitable bearings, j, of frame, H'. The axis of shaft, J', for supporting the idler drum is at an angle to the axis of shaft, h, for the friction drum, H, and thus the idler drum, J, is so positioned with relation to friction drum, H, that the runs or wraps of cable, G, are precluded from overlapping each other on said friction drum, H. As shown, idler drum, J, is provided with a plurality of annular concentric grooves, j', and carriage controlling cable, G, is wrapped first around friction drum, H, in one of the grooves thereof, then around idler drum, J, in one of its grooves, and then the cable is wrapped around drums, H and J, alternately, all as clearly shown in Figs. 3 and 4. The idler drum, J, thus coöperates with the friction drum and the cable so that the runs or wraps of said cable will be retained in the grooves of the respective drums, whereby the parts of the cable engaging with friction drum, H, are precluded from coming into contact with each other.

The frame, H', is positioned to inclose a part of drum, H, and a part of drum, J, together with that portion of the cable which extends between the drums. The parts of the drums which project beyond frame, H', are, in a measure, housed within guards, K, K', see Fig. 3, at the respective ends of the frame. The members, K, K', composing each guard are fastened to an end portion of the frame, and they are united to a member, k, which is braced by angle irons, k', see Figs. 3 and 4. As shown in Fig. 4, inside rope guides, $K^2$, are fastened to the frame, H', or to the guards, K, K', whereby the cable extends between drums, H, J, the guards K, and the guides $K^2$. Said inside guides $K^2$ are positioned between the friction drum and the second drum for directing the runs or loops of the controlling cable in predetermined paths with respect to said drums. It is apparent that the guides $K^2$ are adapted for frictional contact with said runs or loops of the cable so as to serve as retaining means by directing the path of the runs of the cable with respect to the grooves in the friction drum and the second drum.

The operation of the cableway shown in Figs. 1, 3 and 4 will be readily understood from the prior description taken in connection with the drawings. When the load carrying device is to be raised, carriage, C, is locked on the aerial track by applying tension to the operating line, i', so as to apply the brake and restrain the friction drum, H, and cable, G, from movement. To raise the load, cables, D, D', are wound on the engine operated drum until the load reaches a proper point below the carriage. To move the carriage to the right, operating cable, D, is slackened and cable, D', is coiled on the drum, the brake, I, being released so that the cable, G, will follow the movement of the carriage, C, toward the right. When the carriage reaches the point where the load is to be discharged, brake, I, is applied to friction drum, H, for the purpose of arresting the cable, G, and carriage, C, after which cables, D, D', are operated or controlled to lower the load and open the bucket. The cables may now be operated to raise the empty bucket, and by slackening on cable, D', cable, D, may be operated to haul the carriage and bucket to the left. When the carriage reaches the place where the bucket is to work, brake, I, is applied to the friction drum, thus locking cable, G, and restraining carriage, C, from further movement, after which cables, D, D', may be slackened so as to lower the bucket.

The system illustrated in Fig. 2 of the drawings employs a boom, L, suspended by cables, l, from a mast, M, the latter extending upwardly from a series of pockets, m, erected on a pier, m', or the like. On the aerial track afforded by the boom, L, is adapted to travel a carriage, C', having sheaves for the reception of cables, D, D', for operating and controlling a bucket, E, the latter being operated to deliver a load to, or remove it from, a barge, e. Cables, D, D', are fitted to sheaves, d, d', $d^2$, so as to lead to the engine controlled drums, as in the system heretofore described. Controlling cable, G', is operatively fitted to a sheave, g, and a friction drum, $H^2$, the latter being controlled by a band brake, $I^2$, which is operated by lever, $I^3$, the latter being manipulated by the line, $i^2$, substantially as heretofore described in connection with the cableway of Fig. 1. The controlling cable is attached to the respective ends of carriage, C', and it is wrapped on friction drum, $H^2$, and idler drum, $J^2$, the latter being supported in coöperative relation to the cable and the friction drum.

Instead of arranging the idler drum for its axis to be at an angle to the axis of the friction drum, I may employ the arrangements illustrated in Figs. 5 and 6, wherein the friction drum is indicated at $H^3$, and the idler drum is $J^3$. The shaft, $J^4$, of the idler drum is parallel to shaft, $h^3$, of the friction drum, said idler drum having annular concentric grooves, $j'$, and the friction drum having similar annular concentric grooves, $h^2$. The cable is wrapped alternately around the grooved friction drum and the grooved idler drum, and intermediate said drums, $H^3$, $J^3$, is a roller, O. The intermediate roller is supported by a shaft, $o$, parallel to shafts, $J^4$, $h^3$, of drums, $J^3$, $H^3$, the periphery of said roller contacting with the peripheral surfaces of the friction and idler drums. The intermediate roller precludes the tension on the cable, $G^2$, from drawing the idler drum toward the friction drum so as to maintain said elements in proper relation, and to preclude any slip of the cable around the friction drum, it is provided at one end with a gear wheel, $p$, which meshes with a gear pinion, $p'$, on the intermediate roller, whereby the intermediate roller and the friction drum are caused to rotate uniformly.

The system shown in Fig. 7 embodies a friction drum, $H^4$, and an idler drum, $J^4$, the shafts of which are parallel. Cable, $G^3$, is wrapped alternately around the friction drum and the idler drum, and intermediate said drums is a plurality of rollers, $O'$, the shafts of which are parallel to the shafts of the friction and idler drums. Said rollers are positioned on the respective sides of a line intersecting the axes of the friction and idler drums, and said intermediate rollers, $O'$, have frictional contact with the peripheral surfaces of said friction and idler drums for the purposes hereinbefore mentioned.

While I have shown and described the idler drum as a unitary structure and as having a plurality of grooves, it is obvious that the same result (i. e., directing the runs of the cable in spaced order on the power drum) can be attained by the employment of a plurality of direction sheaves $J^5$ mounted on a suitable shaft $J^6$, see Fig. 8, so as to have coöperative relation to the cable and the drum on which said cable is wrapped for the purpose of imparting motion thereto.

Having this fully described the invention, what I claim as new, and desire to secure by Letters Patent is:

1. In a system for hoisting and conveying, the combination with an aerial track, a load-supporting carriage movable thereon, and power cables for imparting traversing movement to said carriage and for handling the load, of a friction drum supported in a raised position relative to the track, brake mechanism coöperating with the friction drum, said brake mechanism being controllable from a distant point, an idle second drum positioned adjacent to the friction drum and to said track, an endless controlling cable connected to the carriage and looped or wrapped alternately around the friction drum and the second drum, said controlling cable being independent of the power cables and receiving motion from the traversing movement of the carriage so as to rotate the friction and second drums, retaining means contacting with the runs or loops of the cable and positioned between the friction drum and the second drum for directing the runs of the controlling cable in predetermined paths with respect to said drums, and a third drum free from frictional contact with the looped portions of the controlling cable, said third drum being positioned between, and in engagement with, said friction drum and second drum.

2. In a system for hoisting and conveying, the combination with a traveling carriage, and a controlling cable therefor, of a plurality of grooved drums around which said cable is alternately wrapped or looped, and directing means separate from, and positioned between, said drums for frictional engagement with the runs or looped portions of the cable, whereby the looped portions of the cable are precluded from frictional contact with each other.

In testimony whereof I have signed my name to this specification in the presence of two subscribing witnesses.

CHARLES A. MORRIS.

Witnesses:
   JAS. H. GRIFFIN,
   H. I. BERNHARD.

Copies of this patent may be obtained for five cents each, by addressing the "Commissioner of Patents, Washington, D. C."